(12) United States Patent
Yanai (10) Patent No.: US 7,969,516 B2
(45) Date of Patent: Jun. 28, 2011

(54) PROJECTOR

(75) Inventor: Hiroaki Yanai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 341 days.

(21) Appl. No.: 12/329,251

(22) Filed: Dec. 5, 2008

(65) Prior Publication Data
US 2009/0153753 A1    Jun. 18, 2009

(30) Foreign Application Priority Data

Dec. 12, 2007  (JP) .................................. 2007-320475

(51) Int. Cl.
*G02F 1/1335* (2006.01)
(52) U.S. Cl. ................................. 349/8; 349/5
(58) Field of Classification Search .................. 349/5, 8
See application file for complete search history.

(56) References Cited

U.S. PATENT DOCUMENTS

| 6,481,850 | B1* | 11/2002 | Takezawa et al. | 353/20 |
|---|---|---|---|---|
| 6,540,360 | B2* | 4/2003 | Furuhata et al. | 353/31 |
| 6,577,375 | B1* | 6/2003 | Umehara et al. | 349/158 |
| 6,619,800 | B1* | 9/2003 | Takezawa et al. | 353/20 |
| 6,619,803 | B2* | 9/2003 | Notagashira | 353/31 |
| 6,833,953 | B2 | 12/2004 | Miyazawa et al. | |
| 6,877,858 | B2* | 4/2005 | Notagashira | 353/20 |
| 6,988,804 | B2* | 1/2006 | Notagashira | 353/20 |
| 7,085,051 | B2 | 8/2006 | Miyazawa et al. | |
| 7,593,076 | B2* | 9/2009 | Yanai et al. | 349/114 |
| 2007/0103606 | A1* | 5/2007 | Hashizume et al. | 349/5 |

FOREIGN PATENT DOCUMENTS

| JP | A-2002-090873 | 3/2002 |
|---|---|---|
| JP | A-2003-215344 | 7/2003 |
| JP | A-2004-198596 | 7/2004 |
| JP | A-2007-163726 | 6/2007 |
| JP | A-2007-183335 | 7/2007 |
| JP | A-2007-226092 | 9/2007 |
| JP | A-2007-240604 | 9/2007 |
| JP | A-2007-256898 | 10/2007 |
| JP | A-2007-316564 | 12/2007 |
| JP | A-2008-051996 | 3/2008 |
| JP | A-2008-051998 | 3/2008 |
| JP | A-2008-051999 | 3/2008 |

* cited by examiner

*Primary Examiner* — Rhonda S Peace
(74) *Attorney, Agent, or Firm* — Oliff & Berridge, PLC (57) ABSTRACT

A projector includes: a lighting device which emits illumination light; a liquid crystal panel which modulates the illumination light emitted from the lighting device according to image information; a projection system which projects light modulated by the liquid crystal panel; a polarization plate which is disposed at least either on the light incident side or the light exit side of the liquid crystal panel and has at least a polarization layer; a liquid crystal panel side light-transmissive substrate affixed to the liquid crystal panel side surface of the polarization plate and made of inorganic material; and an opposite side light-transmissive substrate affixed to the surface of the polarization plate on the side opposite to the liquid crystal panel side surface of the polarization plate. The thickness of the liquid crystal panel side light-transmissive substrate is smaller than the thickness of the opposite side light-transmissive substrate.

7 Claims, 5 Drawing Sheets

PROJECTOR

BACKGROUND

1. Technical Field

The present invention relates to a projector.

2. Related Art

Currently, a projector having a liquid crystal panel includes heat-conductive and light-transmissive substrates affixed to both surfaces (light incident surface and light exit surface) of a polarization plate is known (for example, see JP-A-2004-198596). The heat-conductive and light-transmissive substrates are constituted by sapphire or crystal.

According to the related-art projector having the heat-conductive and light-transmissive substrates attached to both surfaces of the polarization plate, heat generated from the polarization plate (such as heat generated by absorption of light) is released to the outside of the system via the light-transmissive substrates. Thus, temperature increase of the polarization plate can be prevented.

In recent years, there is a demand for increase in quality of projection images by such methods as increasing contrast of the images projected from the projector and reducing unevenness of contrast and color.

According to the related-art projector, however, in the case of the light-transmissive substrate made of sapphire, crystal, quartz, heat-resisting glass, or white plate glass, heat distribution is generated in the plane by heat conducted from the polarization plate. In this case, difference in expansion amount is produced due to temperature difference at the respective positions. As a result, stress is generated inside the light-transmissive substrates. Then, phase retardation (phase retardation caused by heat distortion) of light passing through the light-transmissive substrates is produced. When the phase retardation increases by heat distortion, irregularity of polarization of light passing through the light-transmissive substrates also increases. Thus, contrast of the projection image is lowered, or unevenness of contrast and color is produced according to the in-plane distribution. As a result, the quality of the projection image becomes lower.

SUMMARY

It is an advantage of some aspects of the invention to provide a projector capable of displaying projection images having higher quality than that of a projector in related art.

For providing the above advantage, the present inventors repeatedly conducted experiments and studies, and found that phase retardation caused by heat distortion can be decreased by reducing the thickness of the light-transmissive substrate. More specifically, phase retardation caused by heat distortion is the product of photoelastic constant, thermal stress, and thickness of light-transmissive substrate as shown in the following equation (1). Thus, phase retardation due to heat distortion can be decreased by reducing the thickness of the light-transmissive substrate.

$$\delta = B \times \sigma \times t \quad (1)$$

δ: phase retardation caused by heat distortion, B: photoelastic constant, σ: thermal stress, t: thickness of light-transmissive substrate As described above, the light-transmissive substrate provides effect of reducing temperature increase of the polarization plate. Thus, when both the two light-transmissive substrates affixed to the both surfaces of the polarization plate are made thin, the term of the thickness t of the light-transmissive substrate in equation (1) decreases. However, since thermal stress σ increases, the phase retardation δ caused by heat distortion cannot be reduced so much. Moreover, the temperature of the polarization plate easily increases when both the two light-transmissive substrates are thin. In this case, the polarization plate deteriorates, lowering its polarization characteristics. As a result, the contrast of the projection image decreases. That is, when both the two light-transmissive substrates affixed to both surfaces of the polarization plate are made thin, the effect of preventing lowering of the quality of the projection images caused by phase retardation due to heat distortion decreases. Since prevention of lowering of the projection image quality caused by temperature increase of the polarization plate is difficult, the advantage described above cannot be provided.

Based on this conclusion, the present inventors further conducted experiments and studies, and finally found that temperature increase of the polarization plate can be prevented as much as possible with reduced phase retardation caused by heat distortion when the thickness of the light-transmissive substrate disposed on the liquid crystal panel side (hereinafter referred to as liquid crystal panel side light-transmissive substrate) is made smaller than the thickness of the light-transmissive substrate disposed on the side opposite to the liquid crystal panel side (hereinafter referred to as opposite side light-transmissive substrate). Accordingly, the projector according to this invention can produce images having higher quality than that of the related-art projector.

A projector according to an aspect of the invention includes: a lighting device which emits illumination light; a liquid crystal panel which modulates the illumination light emitted from the lighting device according to image information; a projection system which projects light modulated by the liquid crystal panel; a polarization plate which is disposed at least either on the light incident side or the light exit side of the liquid crystal panel and has at least a polarization layer; a liquid crystal panel side light-transmissive substrate affixed to the liquid crystal panel side surface of the polarization plate and made of inorganic material; and an opposite side light-transmissive substrate affixed to the surface of the polarization plate on the side opposite to the liquid crystal panel side surface of the polarization plate and made of inorganic material. The thickness of the liquid crystal panel side light-transmissive substrate is smaller than the thickness of the opposite side light-transmissive substrate.

According to this projector, the thickness of the liquid crystal panel side light-transmissive substrate is smaller than that of the opposite side light-transmissive substrate. In this case, phase retardation caused by heat distortion produced on the liquid crystal panel side light-transmissive substrate can be reduced, and generation of polarized light irregularity of light passing through the liquid crystal panel side light-transmissive substrate can be decreased. Thus, lowering of the quality of the projection image caused by phase retardation due to heat distortion is prevented.

According to this projector, both the liquid crystal panel side light-transmissive substrate and the opposite side light-transmissive substrate are not thin, but only one of the substrate (liquid crystal panel side light-transmissive substrate) is thin. Thus, sufficient heat release effect can be provided when the other substrate (opposite side light-transmissive substrate) has a certain thickness, and temperature increase of the polarization plate can be sufficiently prevented. As a result, lowering of the quality of the projection image caused by temperature increase of the polarization plate can be reduced as much as possible.

Accordingly, the quality of the projection image produced by the projector according to this aspect of the invention is higher than that of the related-art projector.

When the thickness of the opposite side light-transmissive substrate is smaller than the thickness of the liquid crystal panel side light-transmissive substrate, lowering of the quality of the projection image caused by temperature increase of the polarization plate can be prevented as much as possible. In this case, however, the relatively thick light-transmissive substrate is provided between the polarization plate and the liquid crystal panel. Thus, there is a possibility that phase retardation caused by heat distortion becomes larger than that of the structure having a thin light-transmissive substrate. In this case, the quality of the projection image may be lowered.

On the other hand, according to the projector of the aspect of the invention, the relatively thin light-transmissive substrate is provided between the polarization plate and the liquid crystal panel. Thus, decrease in the quality of the projection image caused by phase retardation due to heat distortion can be suppressed efficiently.

According to this projector, the polarization plate is sandwiched between the liquid crystal panel side light-transmissive substrate and the opposite side light-transmissive substrate from both sides. Thus, predetermined mechanical strength can be obtained.

It is preferable that the liquid crystal panel side light-transmissive substrate and the opposite side light-transmissive substrate are made of the same material.

According to this structure, the axis direction in which heat expansion of the liquid crystal panel side light-transmissive substrate becomes large agrees with the axis direction in which heat expansion of the opposite side light-transmissive substrate becomes large. Thus, thermal deformation of the polarization plate can be prevented.

It is preferable that wherein the liquid crystal panel side light-transmissive substrate and the opposite side light-transmissive substrate are both made of sapphire or crystal.

According to this structure, the light-transmissive substrates made of these materials have extremely high heat conductivity. Thus, heat generated from the polarization plate can be efficiently released to the outside of the system, and temperature increase of the polarization plate can be effectively prevented.

It is preferable that the light-transmissive substrates made of sapphire or crystal are disposed with respect to the polarization plate such that the optical axes of the light-transmissive substrates made of sapphire or crystal extend substantially parallel or substantially perpendicular to the polarization axis of the polarization layer.

When the liquid crystal panel side light-transmissive substrate and the opposite side light-transmissive substrate made of sapphire or crystal having double refraction are used, there is a possibility that undesirable irregularity is caused in the polarization condition of light passing through these light-transmissive substrates.

According to this projector, however, these light-transmissive substrates are disposed such that the optical axes of the light-transmissive substrates are substantially parallel with or perpendicular to the polarization axis of the polarization layer. Thus, undesirable irregularity is not caused in the polarization condition of light passing through the respective light-transmissive substrates.

In this specification, the description "polarization axis of polarization layer" refers to polarization axis of light passing through the polarization layer.

It is preferable that the liquid crystal panel side light-transmissive substrates and the opposite side light-transmissive substrates have different linear expansion coefficients according to the in-plane directions. In this case, it is preferable that the axis direction in which the linear expansion coefficient of the liquid crystal panel side light-transmissive substrate becomes the largest substantially coincides with the axis direction in which the linear expansion coefficient of the opposite side light-transmissive substrate becomes the largest.

According to this structure, thermal deformation of the polarization plate can be similarly prevented.

It is preferable to further include a converging lens disposed on the light incident side of the liquid crystal panel In this case, it is preferable that the polarization plate is disposed on the light incident side of the liquid crystal panel, and that the opposite side light-transmissive substrate affixed to the polarization plate is affixed to the light exit surface of the converging lens.

According to this structure, heat generated from the polarization plate (incident side polarization plate) disposed on the light incident side of the liquid crystal panel is conducted to the converging lens having relatively large heat capacity via the opposite side light-transmissive substrate. Thus, temperature increase of the polarization plate (incident side polarization plate) can be further prevented. Accordingly, heat release capability of the projector can be increased.

It is preferable to further include: a color separation and light guide system which separates the illumination light emitted from the lighting device into a plurality of color lights and guides the separated lights to a illuminated area; a plurality of liquid crystal panels each of which modulates the corresponding color light of the plural lights separated by the color separation and light guide system according to image information; and a cross dichroic prism which has a plurality of light incident end surfaces into which the color lights modulated by the plural liquid crystal panels and a light exit end surface through which the combined color light emit. In this case, it is preferable that the polarization plate is disposed on the light exit side of at least one of the plural liquid crystal panels, and that the opposite side light-transmissive substrate affixed to the polarization plate is bonded to the light incident end surface of the cross dichroic prism.

According to this structure, heat generated from the polarization plate (exit side polarization plate) disposed on the light exit side of the liquid crystal panel is conducted to the cross dichroic prism having relatively large heat capacity via the opposite side light-transmissive substrate. Thus, temperature increase of the polarization plate (exit side polarization plate) can be further prevented. Accordingly, heat release capability of the projector can be increased.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projector according to exemplary embodiment of the invention is hereinafter described with reference to the drawings.

First Embodiment

Figure 1:
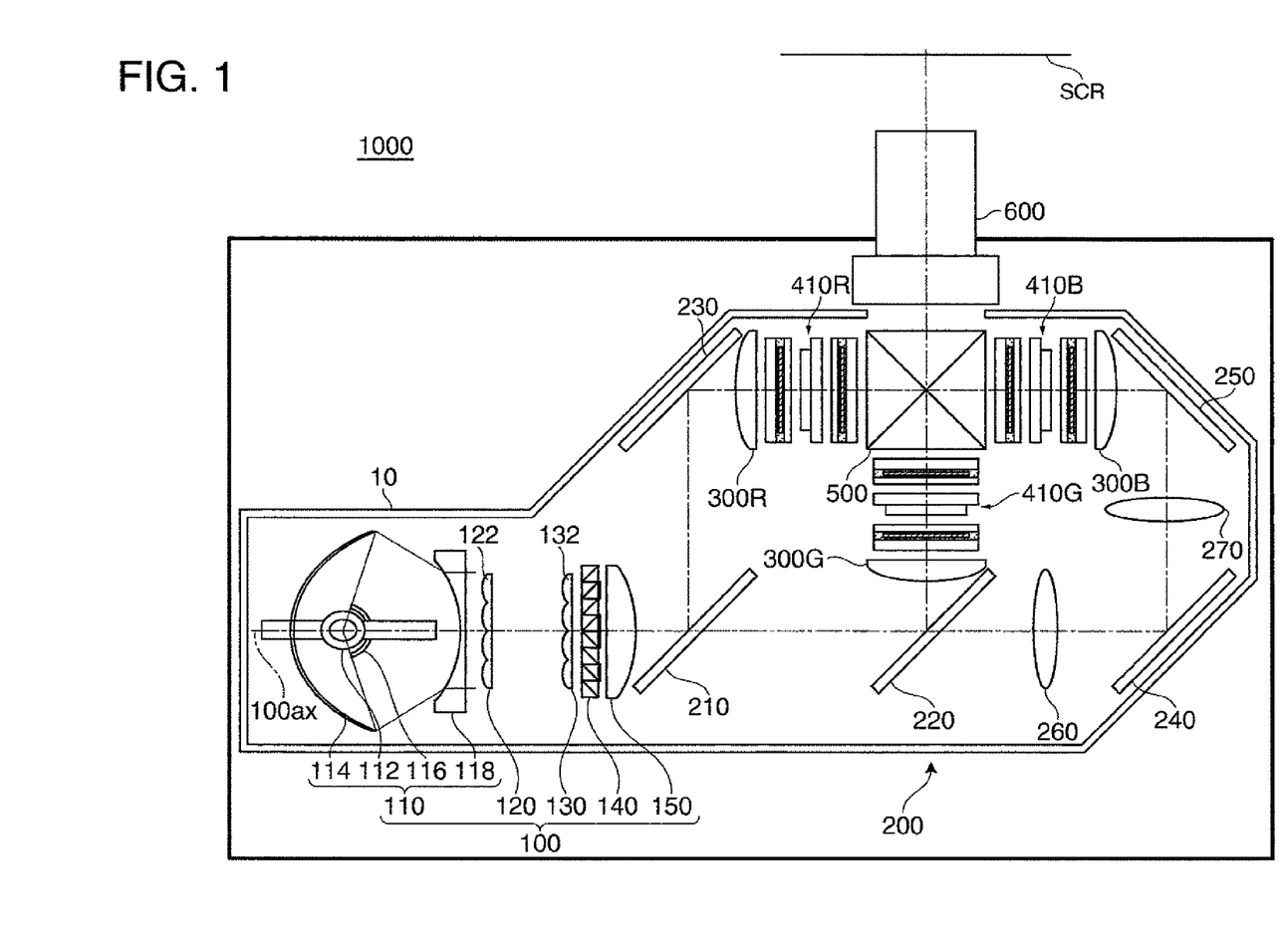
FIG. 1 illustrates optical systems included in a projector 1000 according to a first embodiment.
Figure 2A:
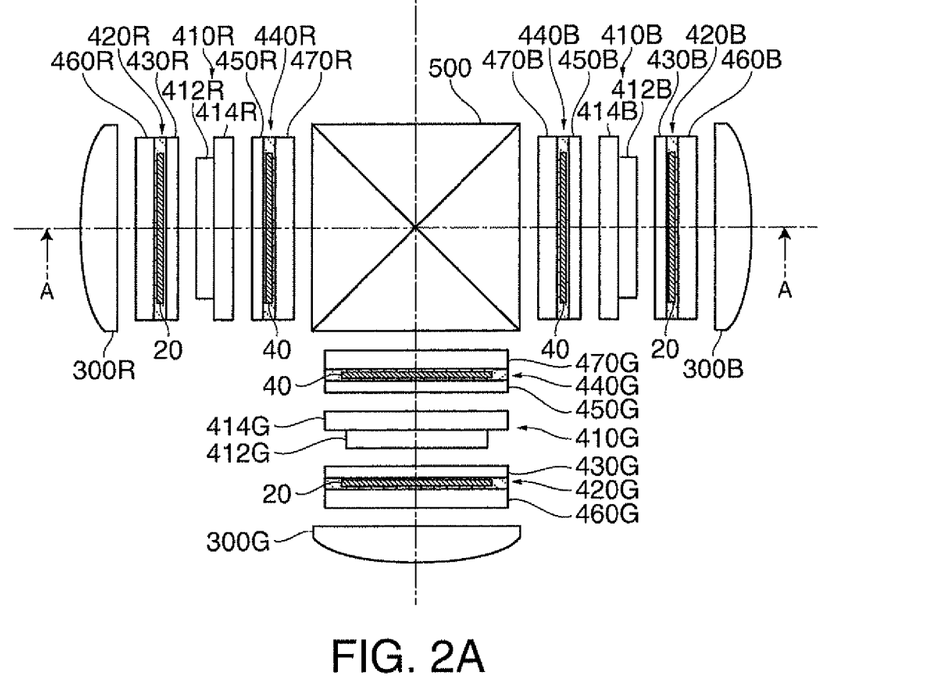
FIGS. 2A and 2B illustrate a main part of the projector 1000 in the first embodiment.
Figure 2B:
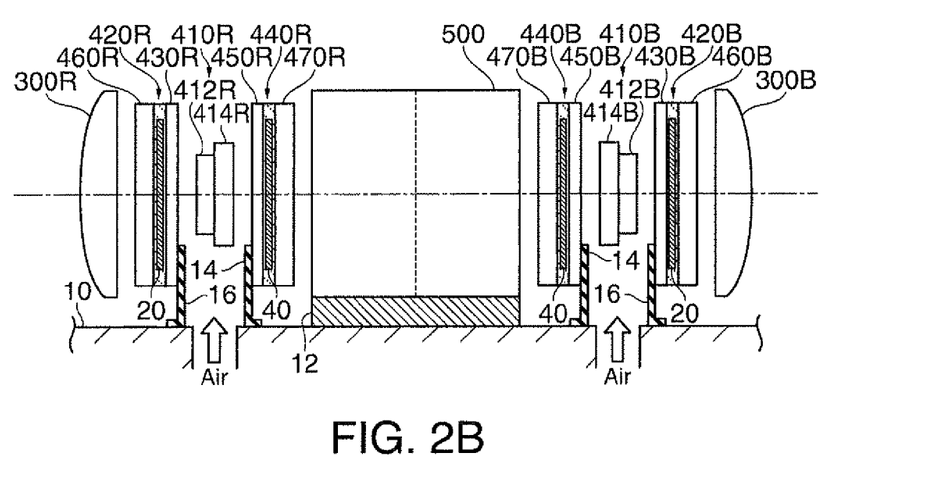

FIG. 1 illustrates optical systems included in a projector 1000 in the first embodiment, FIGS. 2A and 2B illustrate a main part of the projector 1000 in the first embodiment. FIG. 2A shows a part around a cross dichroic prism 500 as viewed from above, and FIG. 2B is a cross-sectional view taken along a line A-A in FIG. 2A.

Figure 3:
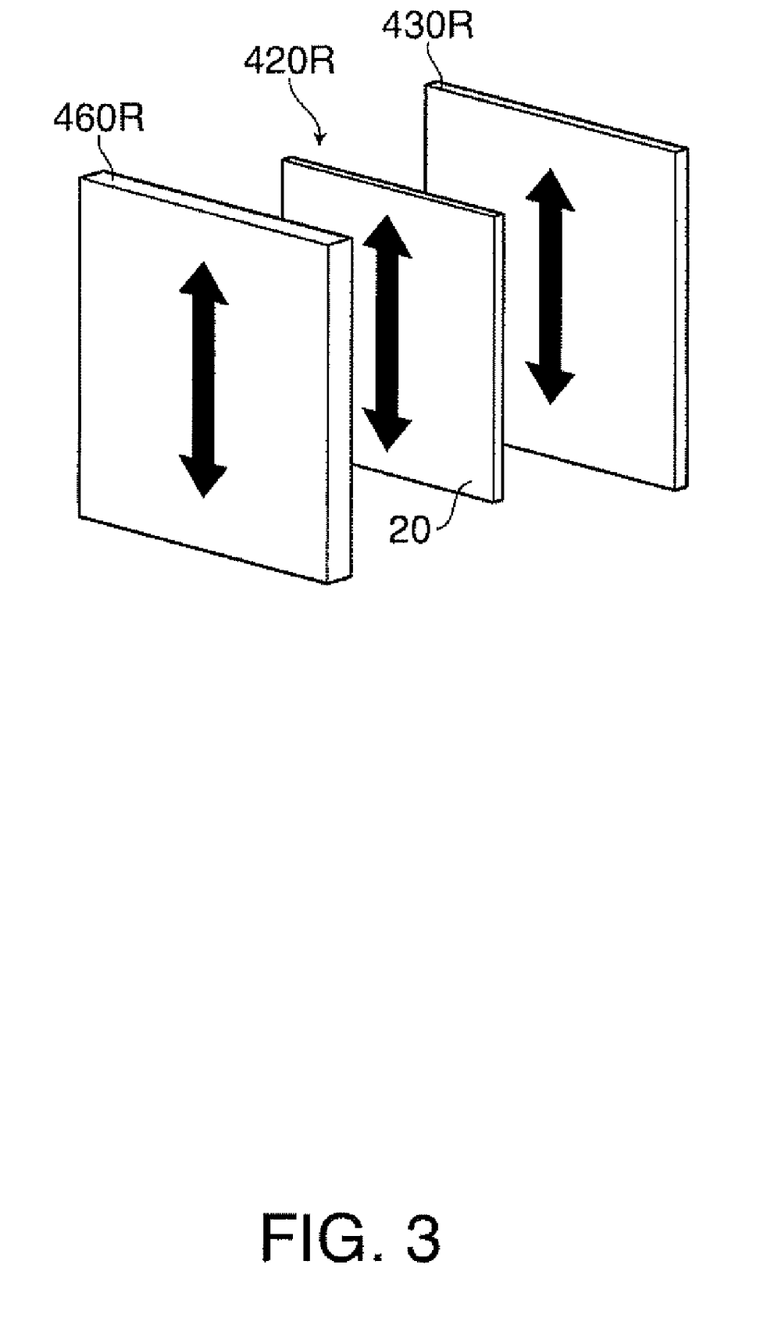
FIG. 3 illustrates an arrangement condition of light-transmissive substrates 430R and 460R with respect to an incident side polarization plate 420R.

FIG. 3 illustrates an arrangement condition of respective light-transmissive substrates 430R and 460R with respect to an incident side polarization plate 420R.

As illustrated in FIG. 1, the projector 1000 according to the first embodiment includes a lighting device 100, a color separation and light guide system 200 which separates illumination light emitted from the lighting device 100 into three color lights of red light, green light, and blue light and guides the separated three color lights to a illuminated area, three liquid crystal panels 410R, 410G, and 410B as electro-optical modulation devices for modulating each of the three color lights separated by the color separation and light guide system 200 according to image information, the cross dichroic prism 500 for combining the color lights modulated by the three liquid crystal panels 410R, 410G, and 410B, and a projection system 600 for projecting the light combined by the cross dichroic prism 500 on a projection surface such as a screen SCR. These optical systems are accommodated in a housing 10.

The lighting device 100 includes a light source device 110 as a light source for emitting substantially parallel illumination light toward the illuminated area, a first lens array 120 having a plurality of first small lenses 122 for dividing the illumination light emitted from the light source device 110 into a plurality of partial lights, a second lens array 130 having a plurality of second small lenses 132 corresponding to the plural first small lenses 122 of the first lens array 120, a polarization conversion element 140 for converting illumination lights emitted from the light source device 110 and having different polarization directions into substantially one type of linear polarized lights, and a superimposing lens 150 for superimposing the respective partial lights released from the polarization conversion element 140 on the illuminated area.

The light source device 110 has an ellipsoidal reflector 114, an arc tube 112 having the light emission center in the vicinity of a first focus of the ellipsoidal reflector 114, a sub mirror 116 for reflecting light emitted to the illuminated area from the arc tube 112 again toward the arc tube 112, and a concave lens 118 for releasing the converged light coming from the ellipsoidal reflector 114 as substantially parallel light. The light source device 110 emits light having the center axis of illumination optical axis 100ax.

The arc tube 112 has a tube spherical part and a pair of seal portions extending to both sides of the tube spherical part. The tube spherical part is a spherical component made of quartz glass. The tube spherical part has a pair of electrodes disposed within the tube spherical part, and mercury, rare gas, and a small amount of halogen sealed into the tube spherical part.

The arc tube 112 may be constituted by various types of arc tube such as metal halide lamp, high pressure mercury lamp, and extra-high pressure mercury lamp.

The ellipsoidal reflector 114 has a cylindrical neck portion inserted into one of the seal portions of the arc tube 112 to be fixed to the seal portion, and a reflection concave surface for reflecting light emitted from the arc tube 112 toward a second focal position, The sub mirror 116 is a reflection unit disposed opposed to the reflection concave surface of the ellipsoidal reflector 114 and covering substantially half of the tube spherical portion of the arc tube 112. The sub mirror 116 is inserted into the other seal portion of the arc tube 112 to be fixed thereto. The sub mirror 116 returns light not traveling toward the ellipsoidal reflector 114 in the light emitted from the arc tube 112 toward the arc tube 112 such that the light can enter the ellipsoidal reflector 114.

The concave lens 118 is disposed on the illuminated area side of the ellipsoidal reflector 114. The concave lens 118 is so constructed as to release the light coming from the ellipsoidal reflector 114 toward the first lens array 120.

The first lens array 120 has function of light division optical element for dividing light released from the concave lens 118 into plural partial lights. The first lens array 120 has the plural first small lenses 122 arranged in matrix having plural lines and plural rows on the plane orthogonal to the illumination optical axis 100ax. Though not shown in the figure, each external shape of the first small lenses 122 is similar to each external shape of the image forming areas of the liquid crystal panels 410R, 410G, and 410B.

The second lens array 130 has function of forming images of the respective first small lenses 122 of the first lens array 120 in the vicinity of the image forming areas of the liquid crystal panels 410R, 410G, and 410B in cooperation with the superimposing lens 150. The second lens array 130 has a structure similar to that of the first lens array 120, containing the plural second small lenses 132 arranged in matrix having plural lines and rows on the plane orthogonal to the illumination optical axis 100ax.

The polarization conversion element 140 is a conversion element for converting the respective partial lights divided by the first lens array 120 and having different polarization directions into substantially one type of linear polarized lights having the same polarization direction.

The polarization conversion element 140 has a polarized light separation layer which transmits one of linear polarization components contained in the illumination light emitted from the light source device 110 and reflects the other linear polarization component in the direction perpendicular to the illumination optical axis 100ax, a reflection layer for reflecting the other linear polarization component reflected by the polarized light separation layer in a direction parallel with the illumination optical axis 100ax, and a retardation film for converting the other linear polarization component reflected by the reflection layer into the one linear polarization component.

The superimposing lens 150 are an optical element which converges the plural partial lights having passed through the first lens array 120, the second lens array 130, and the polarization conversion element 140, and superimposes the converged lights in the vicinity of the image forming areas of the liquid crystal panels 410R, 410G, and 410B. The superimposing lens 150 is disposed such that the optical axis of the superimposing lens 150 substantially coincides with the illumination optical axis 100ax of the lighting device 100. The superimposing lens 150 may be constituted by a combined lens having a plurality of lenses.

The color separation and light guide system 200 has dichroic mirrors 210 and 220, reflection mirrors 230, 240, and 250, an entrance side lens 260, and a relay lens 270. The color separation and light guide system 200 separates illumination light emitted from the lighting device 100 into three color lights of red light, green light, and blue light, and guides the respective color lights toward the liquid crystal panels 410R, 410G, and 410B as illumination targets.

The dichroic mirror 210 and 220 are optical elements each of which has wavelength selection film on the substrate for reflecting light in a predetermined wavelength range and transmits light in the other wavelength range. The dichroic mirror 210 disposed upstream of the optical path is a mirror which reflects red light component and transmits the other color light components. The dichroic mirror 220 disposed downstream of the optical path is a mirror which reflects green light component and transmits blue light component.

The red light component reflected by the dichroic mirror 210 is reflected by the reflection mirror 230 and enters the red light liquid crystal panel 410R via a converging lens 300R. The converging lens 300R is provided to convert the respective partial lights released from the superimposing lens 150 into lights substantially parallel with the respective chief lights. Other converging lenses 300G and 300B have a structure similar to that of the converging lens 300R.

The green light component contained in the green and blue light components having passed through the dichroic mirror 210 is reflected by the dichroic mirror 220. Then, the green light component passes through the converging lens 300G and enters the green light liquid crystal panel 410G. On the other hand, the blue light component having passed the dichroic mirror 220 passes through the entrance side lens 260, the reflection mirror 240 on the entrance side, the relay lens 270, and the reflection mirror 250 on the exit side, and the converging lens 300B, and enters the blue light liquid crystal panel 410B. The entrance side lens 260, the relay lens 270, and the reflection mirrors 240 and 250 have function of guiding the blue light component having passed the dichroic mirror 220 toward the liquid crystal panel 410B.

The entrance side lens 260, the relay lens 270, and the reflection mirrors 240 and 250 are provided on the blue light optical path so as to prevent lowering of light utilization efficiency of blue light having longer optical path than those of the other color lights due to diffusion of light or for other reasons. The projector 1000 in the first embodiment has this structure since the blue light has long optical path. However, the optical path of red light may be extended, and the entrance side lens 260, the relay lens 270, and the reflection mirrors 240 and 250 may be provided on the optical path of the red light.

The liquid crystal panels 410R, 410G, and 410B modulate illumination light according to image information as illumination targets of the lighting device 100.

The red light liquid crystal panel 410R is formed by sealing liquid crystals as electro-optic substances into a pair of transparent glass substrates 412R and 414R. The liquid crystal panel 410R modulates the polarization direction of one type of linear polarized light released from the incident side polarization plate 420R according to a given image signal using polysilicon TFT as switching elements, for example. The other color lights liquid crystal panels 410G and 410B have a structure similar to that of the liquid crystal panel 410R. Though not shown in the figure, the liquid crystal panels 410R, 410G, and 410B are supported by a liquid crystal panel supporting frame constituted by aluminum die-casting frame, for example.

As illustrated in FIGS. 2A and 2B, the incident side polarization plates 420R, 420G, and 420B are disposed between the converging lenses 300R, 300G, and 300B and the liquid crystal panels 410R, 410G, and 410B, and have function of transmitting only linear polarized lights each having axis in a predetermined direction in the light released from the converging lenses 300R, 300G, and 300B and absorbing other lights.

The incident side polarization plate 420R has a polarization layer 20. The polarization layer 20 is preferably constituted by a polarization layer formed by coloring polyvinyl alcohol (PVA) with iodine or bicolor dye and uniaxially extending the dye such that molecules of the dye can be disposed in one direction. The polarization layer 20 thus formed by uniaxial extension has function of absorbing polarized light in the direction parallel with the uniaxial extension direction and transmitting polarized light in the direction perpendicular to the uniaxial extension direction. The other incident side polarization plates 420G and 420B have a structure similar to that of the incident side polarization plate 420R.

The light-transmissive substrates 430R, 430G, and 430B as liquid crystal panel side light-transmissive substrates are affixed to the liquid crystal panel side (light exit side) surfaces of the incident side polarization plates 420R, 420G, and 420B via adhesive layers C. Not-shown anti-reflection layers are provided on the light exit side surfaces of the light-transmissive substrates 430R, 430G, and 430B. The light-transmissive substrates 430R, 430G, and 430B are made of sapphire, for example. The light-transmissive substrate made of sapphire has high heat conductivity of about 40 W/(m·K), extremely high hardness, low heat expansion coefficient, and high transparency, and is not easily scratched. When cost reduction is important for requiring only medium luminance, light-transmissive substrate made of crystal having heat conductivity of about 10 W/(m·K) may also be used. Each thickness of the light-transmissive substrates 430R, 430G, and 430B is about 0.5 mm, for example.

The light-transmissive substrates 460R, 460G, and 460B as opposite side light-transmissive substrates are affixed to the surfaces on the side opposite to the liquid crystal panel side of the incident side polarization plates 420R, 420G, and 420B via adhesive layers C. Not-shown anti-reflection layers are provided on the light incident side surfaces of the light-transmissive substrates 460R, 460G, and 460B. Similarly to the light-transmissive substrates 430R, 430G, and 430B, the light-transmissive substrates 460R, 460G, and 460B are made of sapphire, for example. Each thickness of the light-transmissive substrates 460R, 460G, and 460B is about 1.5 mm, for example.

As illustrated in FIG. 3, the liquid crystal panel side light-transmissive substrate 430R and the opposite side light-transmissive substrate 460R are disposed such that the optical axes of the light-transmissive substrates 430R and 460R are substantially parallel with the polarization axis of the polarization layer 20 (polarization axis of light passing through the polarization layer 20) of the incident side polarization plate 420R. This positioning applies to the liquid crystal panel side light-transmissive substrates 430G and 430B and the opposite side light-transmissive substrates 460G and 460B of the other incident side polarization plates 420G and 420B.

Exit side polarization plates 440R, 440G, and 440B are disposed between the liquid crystal panels 410R, 410G, and 410B and the cross dichroic prism 500, and have function of transmitting only linear polarized light having axis in a predetermined direction among the light emitted from the liquid crystal panel 410R, 410G and 410B and absorbing other light.

The exit side polarization plate 440R has a polarization layer 40. The polarization layer 40 is made of material similar to that of the incident side polarization plate 420R. The other exit side polarization plates 440G and 440B have a structure similar to that of the exit side polarization plate 440R.

Light-transmissive substrates 450R, 450G, and 450B as liquid crystal panel side light-transmissive substrates are affixed to the liquid crystal panel side (light incident side) surfaces of the exit side polarization plates 440R, 440G, and 440B via adhesive layers C. Not-shown anti-reflection layers are provided on the light incident side surfaces of the light-transmissive substrates 450R, 450G, and 450B. The light-transmissive substrates 450R, 450G, and 450B are made of sapphire, for example, similarly to the light-transmissive substrates 430R, 430G, and 430B, and others. Each thickness of the light-transmissive substrates 450R, 450G, and 450B is about 0.5 mm, for example.

Light-transmissive substrates 470R, 470G, and 470B as opposite side light-transmissive substrates are affixed to the surfaces on the side opposite to the liquid crystal panel side of the exit side polarization plates 440R, 440G, and 440B via adhesive layers C. Not-shown anti-reflection layers are provided on the light exit side surfaces of the light-transmissive substrates 470R, 470G, and 470B. The light-transmissive substrates 470R, 470G, and 470B are made of sapphire, for example, similarly to the light-transmissive substrates 430R, 430G, and 430B, and others. Each thickness of the light-transmissive substrates 470R, 470G, and 470B is about 1.5 mm, for example.

Heat conductive members 14 and 16 for conducting heat between the housing 10 and the light-transmissive substrates 430R, 430G, 430B, 450R, 450G, and 450B are provided at the lower ends of the respective light-transmissive substrates.

Though not shown in the figure, the liquid crystal panel side light-transmissive substrate 450R and the opposite side light-transmissive substrate 470R are disposed in such positions as to be substantially parallel with the polarization axis of the polarization layer 40 of the exit side polarization plate 440R similarly to the incident side polarization plate. This applies to the liquid crystal panel side light-transmissive substrates 450G and 450B and the opposite side light-transmissive substrates 470G and 470B on the other exit side polarization plates 440G and 440B.

The end surfaces of the polarization layers 20 of the incident side polarization plates 420R, 420G, and 420B, and the end surfaces of the polarization layers 40 of the exit side polarization plates 440R, 440G, and 440B are surrounded by the adhesive layers C. The adhesive provided on the adhesive layer C is preferably formed by ultraviolet hardening adhesive or visible short-wavelength light hardening adhesive, for example.

The incident side polarization plates 420R, 420G, and 420B, and the exit side polarization plates 440R, 440G, ad 440B are set and disposed such that the directions of the respective polarization axes cross each other at right angles.

The cross dichroic prism 500 is an optical element which combines optical images modulated for each color light released from the exit side polarization plates 440R, 440G, and 440B to form color images. The cross dichroic prism 500 has three light incident end surfaces through which the color lights modulated by the liquid crystal panels 410R, 410G, and 410B enter, and a light exit end surface through which the combined color light is released. The cross dichroic prism 500 has a substantially square shape in the plan view formed by affixing four rectangular prisms. Dielectric multi-layer films are provided on the boundaries between the affixed rectangular prisms having a substantially X shape. The dielectric multi-layer film affixed on one of the substantially X-shaped boundaries reflects red light, and the dielectric multi-layer film formed on the other boundary reflects blue light. Thus, the red light and blue light are bended by the dielectric multi-layer films such that these lights can travel in the same direction as that of the green light. As a result, the three color lights are combined.

The cross dichroic prism 500 is provided on the housing 10 via a heat conductive spacer 12 (see FIG. 2B).

A color image released from the cross dichroic prism 500 is enlarged and projected by the projection system 600 to be formed into a large screen image on the screen SCR.

Though not shown in the figure, at least one fan and plural cooling air flow paths for cooling the respective optical systems are provided within the projector 1000. The air taken from the outside into the projector 1000 circulates within the projector 1000 by using the fan and the plural cooling air flow paths, and is finally discharged to the outside. As illustrated in FIGS. 2A and 2B, the air flowing through air holes (cooling air flow paths) promotes heat release from the cross dichroic prism 500 and the like.

For simplifying the explanation of the projector 1000 having this structure in the first embodiment, only the components provided on the optical path of red light in the projector 1000 according to the first embodiment are now discussed in more detail.

According to the projector 1000 in the first embodiment, the thickness of the liquid crystal panel side light-transmissive substrate 430R is smaller than that of the opposite side light-transmissive substrate 460R when compared with the two light-transmissive substrates 430R and 460R affixed to the incident side polarization plate 420R. Also, the thickness of the liquid crystal panel side light-transmissive substrate 450R is smaller than that of the opposite side light-transmissive substrate 470R when compared with the two light-transmissive substrates 450R and 470R affixed to the exit side polarization plate 440R. In this structure, phase retardation caused by heat distortion generated on the liquid crystal panel side light-transmissive substrates 430R and 450R can be decreased, and irregularity of polarized light passing through the liquid crystal panel side light-transmissive substrates 430R and 450R can be reduced. Accordingly, lowering of the quality of the projection image caused by phase retardation generated due to heat distortion can be prevented.

According to the projector 1000 in the first embodiment, both of the pair of the liquid crystal panel side light-transmissive substrate 430R and the opposite side light-transmissive substrate 460R, and the pair of the light-transmissive substrate 450R and the light-transmissive substrate 470R are not made thin, but only one of each pair of the substrates (liquid crystal panel side light-transmissive substrates 430R and 450R) is thin. Thus, sufficient heat release effect can be provided when the other of the pair of the substrates (opposite side light-transmissive substrates 460R and 470R) has a certain thickness, and temperature increase of the incident side polarization plate 420R and the exit side polarization plate 440R can be sufficiently prevented. As a result, lowering of the quality of the projection image caused by temperature increase of the polarization plates can be reduced as much as possible.

Accordingly, the projector 1000 in the first embodiment is a projector capable of producing projection images having higher quality than that of the related-art projector.

According to the projector 1000 in the first embodiment, the relatively thin light-transmissive substrates 430R and 450R are provided between the incident side polarization plate 420R and the liquid crystal panel 410R and between the liquid crystal panel 410R and the exit side polarization plate 440R. Thus, lowering of the quality of the projection image caused by phase retardation due to heat distortion can be effectively prevented.

According to the projector 1000 in the first embodiment, the incident side polarization plate 420R is sandwiched between the two light-transmissive substrates 430R and 460R from both sides. Also, the exit side polarization plate 440R is sandwiched between the two light-transmissive substrates 450R and 470R from both sides. Thus, predetermined mechanical strength can be obtained.

According to the projector 1000 in the first embodiment, the liquid crystal panel side light-transmissive substrate 430R and the opposite side light-transmissive substrate 460R are made of the same material. Thus, the axis direction of large heat expansion of the liquid crystal panel side light-transmissive substrate 430R becomes equal to that of the opposite side light-transmissive substrate 460R. As a result, heat deformation of the incident side polarization plate 420R can be prevented. Similarly to the incident side polarization plate 420R, the liquid crystal panel side light-transmissive substrate 450R and the opposite side light-transmissive substrate 470R of the exit side polarization plate are made of the same material. Thus, the axis direction of large heat expansion of the liquid crystal panel side light-transmissive substrate 450R becomes equal to that of the opposite side light-transmissive substrate 470R. As a result, heat deformation of the exit side polarization plate 440R can be prevented.

According to the projector 1000 in the first embodiment, the light-transmissive substrates 430R, 450R, 460R, and 470R are made of sapphire. The light-transmissive substrate made of sapphire has extremely high heat conductivity, and can release heat generated from the incident side polarization plate 420R and the exit side polarization plate 440R to the outside of the system with high efficiency. Accordingly, temperature increase of the incident side polarization plate 420R and the exit side polarization plate 440R can be effectively prevented.

According to the projector 1000 in the first embodiment, the light-transmissive substrates 430R and 460R are disposed with respect to the incident side polarization plate 420R such that the optical axes of the light-transmissive substrates 430R and 460R are substantially parallel with the polarization axis of the polarization layer 20. Also, the light-transmissive substrates 450R and 470R are disposed with respect to the exit side polarization plate 440R such that the optical axes of the light-transmissive substrates 450R and 470R are substantially parallel with the polarization axis of the polarization layer 40. Thus, undesirable irregularity is not caused in the polarization condition of light passing through the respective light-transmissive substrates.

According to the projector 1000 in the first embodiment, the incident side polarization plate 420R and the light-transmissive substrates 430R and 450R, and the exit side polarization plate 440R and the light-transmissive substrates 450R and 470R are affixed by adhesive, respectively. Thus, surface reflection on the boundaries between the respective members is prevented, and light transmissivity can be increased. Moreover, separation is not easily caused from the attachment surfaces of the respective members even when the linear expansion coefficients of the incident side polarization plate 420R, exit side polarization plate 440R, and the light-transmissive substrates 430R, 450R, 460R, and 470R are different from one another. Thus, long-term reliability does not lower.

According to the projector 1000 in the first embodiment, the housing 10 for accommodating the respective optical systems and the heat conductive members 14 and 16 for conducting heat between the housing 10 and the light-transmissive substrates 430R and 460R are further provided. Thus, heat generated from the incident side polarization plate 420R and the exit side polarization plate 440R can be released to the housing 10 via the light-transmissive substrates 430R and 450R and the heat conductive members 14 and 16. Accordingly, the heat release capability of the projector 1000 can be increased. The heat conductive members 14 and 16 are preferably made of metal material such as aluminum.

According to the projector 1000 in the first embodiment, the cooling air flow paths for cooling the light-transmissive substrates 430R and 450R are provided. Thus, the light-transmissive substrates 430R and 450R can be cooled by cooling air taken through the cooling air flow paths. Accordingly, temperature increase of the light-transmissive substrates 430R and 450R can be prevented, and heat generated from the incident side polarization plate 420R and the exit side polarization plate 440R can be efficiently removed.

Second Embodiment

Figure 4A:
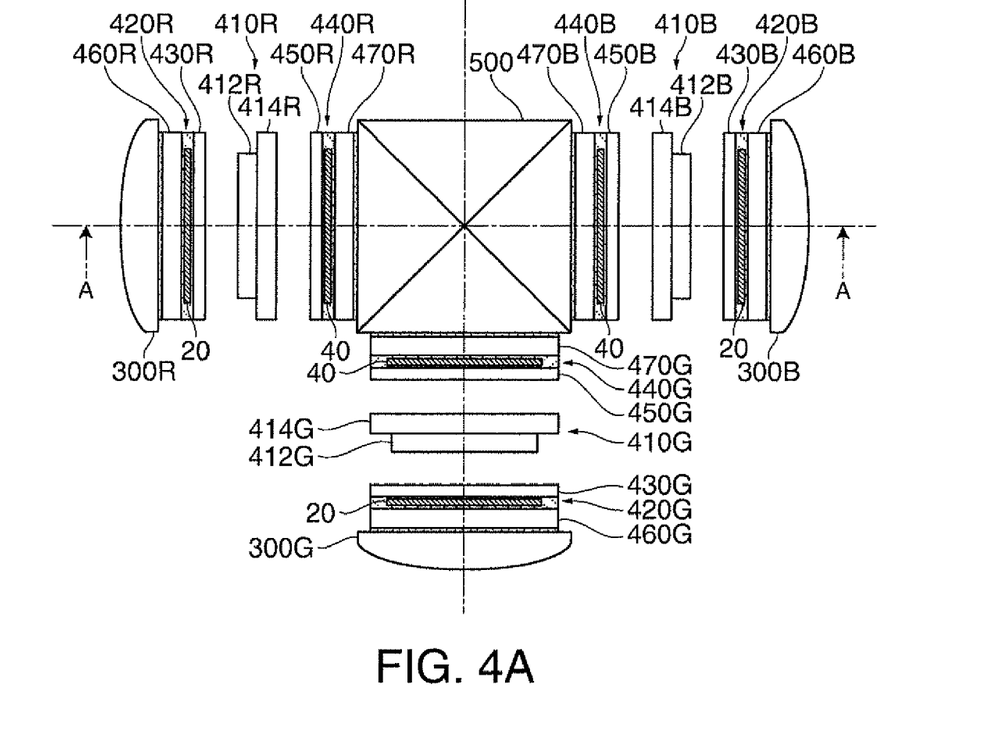
FIGS. 4A and 4B illustrate a main part of a projector 1002 in a second embodiment.
Figure 4B:
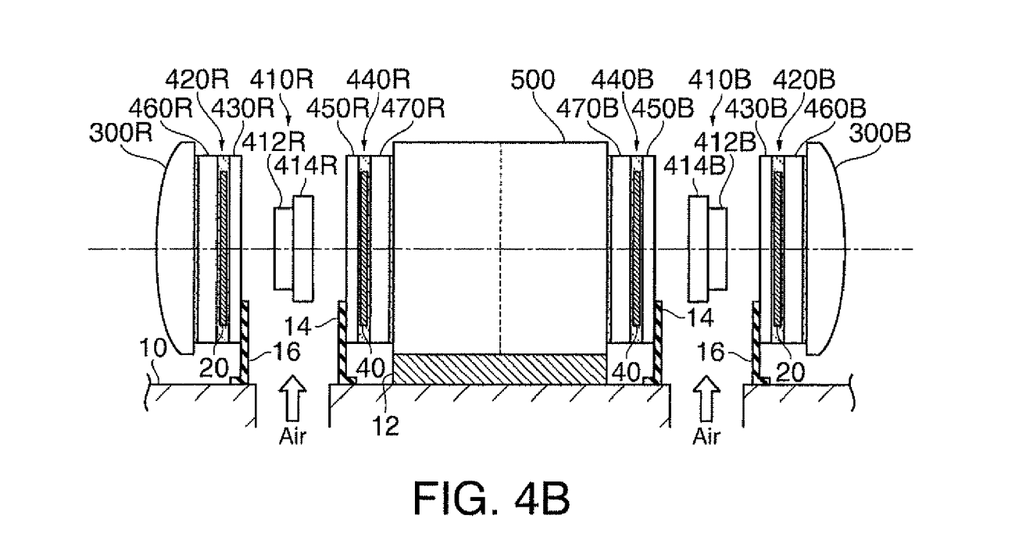

FIGS. 4A and 4B illustrate a main part of a projector 1002 according to a second embodiment. FIG. 4A illustrates a part around the cross dichroic prism 500 as viewed from above, and FIG. 4B is a cross-sectional view taken along a line A-A in FIG. 4A. In FIGS. 4A and 4B, similar reference numbers are given to parts similar to those shown in FIGS. 2A and 2B, and the same detailed description of those is not repeated.

The projector 1002 in the second embodiment basically has a structure similar to that of the projector 1000 in the first embodiment. However, the projector 1002 is different from the projector 1000 in the first embodiment in that the light-transmissive substrates affixed to the incident side polarization plates are bonded to the converging lenses, and that the light-transmissive substrates affixed to the exit side polarization plates are bonded to the cross dichroic prism.

More specifically, according to the projector 1002 in the second embodiment, the light-transmissive substrate 460R as the opposite side light-transmissive substrate affixed to the incident side polarization plate 420R is bonded to the light exit surface of the converging lens 300R via adhesive layer as illustrated in FIGS. 4A and 4B. The other light-transmissive substrates 460G and 460B are also bonded to the light exit surfaces of the converging lenses 300G and 300B, respectively.

Also, the light-transmissive substrate 470R as the opposite side light-transmissive substrate affixed to the exit side polarization plate 440R is bonded to the light incident end surface of the cross dichroic prism 500 via adhesive layer. The other light-transmissive substrates 470G and 470B are also bonded to the light incident end surfaces of the cross dichroic prism 500, respectively.

Therefore, the projector 1002 according to the second embodiment is different from the projector 1000 in the first embodiment in that the light-transmissive substrates affixed to the incident side polarization plates are bonded to the converging lenses, and that the light-transmissive substrates affixed to the exit side polarization plates are bonded to the cross dichroic prism. However, similarly to the projector 1000 in the first embodiment, the thickness of the liquid crystal panel side light-transmissive substrate 430R of the two light-transmissive substrates 430R and 460R affixed to the incident side polarization plate 420R is smaller than that of the opposite side light-transmissive substrate 460R, and the thickness of the liquid crystal panel side light-transmissive substrate 450R of the two light-transmissive substrates 450R and 470R affixed to the exit side polarization plate 440R is smaller than that of the opposite side light-transmissive substrate 470R. Thus, the projector can produce projection images having higher quality than that of the related-art projector.

According to the projector 1002 in the second embodiment, the light-transmissive substrates 460R, 460G, and 460B affixed to the incident side polarization plates 420R, 420G, and 420B are bonded to the light exit surfaces of the converging lens 300R, 300G, and 300B. In this structure, heat generated from the incident side polarization plates 420R, 420G, and 420B is conducted to the converging lenses 300R, 300G, and 300B having relatively large heat capacity via the light-transmissive substrates 460R, 460G, and 460B. Thus, temperature increase of the incident side polarization plates 420R, 420G, and 420B can be further reduced, and heat release capability of the projector 1002 can be enhanced.

According to the projector 1002 in the second embodiment, the light-transmissive substrates 470R, 470G, and 470B affixed to the exit side polarization plates 440R, 440G, and 440B are bonded to the light incident end surfaces of the cross dichroic prism 500. In this structure, heat generated from the exit side polarization plates 440R, 440G, and 440B is conducted to the cross dichroic prism 500 having relatively large heat capacity via the light-transmissive substrates 470R, 470G, and 470B. Thus, temperature increase of the exit side polarization plates 440R, 440G, and 440B can be further reduced, and heat release capability of the projector 1002 can be enhanced.

The projector 1002 in the second embodiment has a structure similar to that of the projector 1000 in the first embodiment except for the points that the light-transmissive substrates affixed to the incident side polarization plates are bonded to the converging lenses, and that the light-transmissive substrates affixed to the exit side polarization plates are bonded to the cross dichroic prism. Thus, the projector 1002 can offer advantages associated therewith and included in the advantages provided by the projector 1000 in the first embodiment.

Third Embodiment

Figure 5:
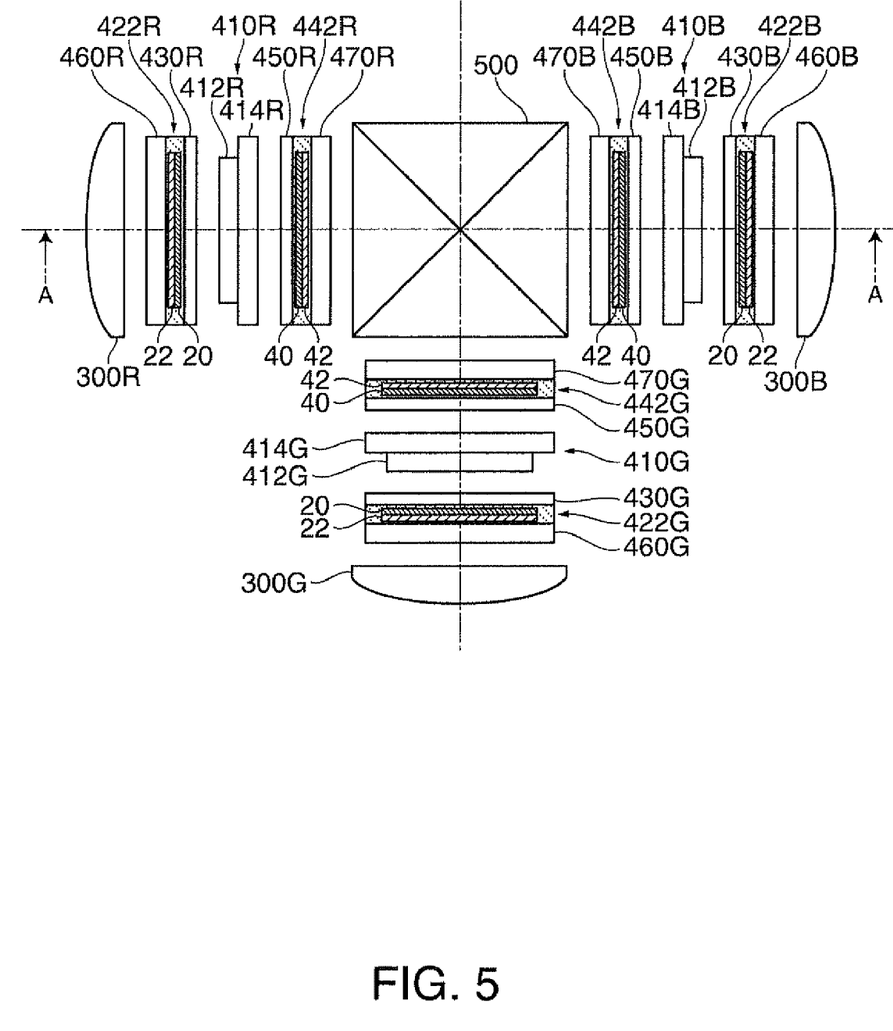
FIG. 5 illustrates a main part of a projector 1004 in a third embodiment.

FIG. 5 illustrates a main part of a projector 1004 according to a third embodiment. In FIG. 5, similar reference numbers are given to parts similar to those shown in FIGS. 2A and 2B, and the same detailed description of those is not repeated.

The projector 1004 in the third embodiment basically has a structure similar to that of the projector 1000 in the first embodiment. However, the projector 1004 is different from the projector 1000 in the first embodiment in that the polarization plates further have supporting layers.

More specifically, according to the projector 1004 in the third embodiment, an incident side polarization plate 422R has the polarization layer 20, and a supporting layer 22 disposed on the side opposite to the liquid crystal panel 410R side of the polarization layer 20 (converging lens 300R side) to support the polarization layer 20 as illustrated in FIG. 5. The supporting layer 22 has function of regulating return of the polarization layer 20 from the extended condition to the original condition. The supporting layer 22 is preferably constituted by a supporting layer made of tri-acetyl cellulose (TAC). Other incident side polarization plates 422G and 422B have a structure similar to that of the incident side polarization plate 422R.

An exit side polarization plate 442R has the polarization layer 40, and a supporting layer 42 disposed on the side opposite to the liquid crystal panel 410R side of the polarization layer 40 (cross dichroic prism 500 side) to support the polarization layer 40. The supporting layer 42 has function of regulating return of the polarization layer 40 from the extended condition to the original condition. The supporting layer 42 is preferably constituted by a supporting layer made of tri-acetyl cellulose (TAC). Other exit side polarization plates 442G and 442B have a structure similar to that of the exit side polarization plate 442R.

The projector 1004 in the third embodiment is different from the projector 1000 in the first embodiment in that the polarization plates further have the supporting layers. However, similarly to the projector 1000 in the first embodiment, the thickness of the liquid crystal panel side light-transmissive substrate 430R of the two light-transmissive substrates 430R and 460R affixed to the incident side polarization plate 422R is smaller than that of the opposite side light-transmissive substrate 460R, and the thickness of the liquid crystal panel side light-transmissive substrate 450R of the two light-transmissive substrates 450R and 470R affixed to the exit side polarization plate 442R is smaller than that of the opposite side light-transmissive substrate 470R. Thus, the projector can produce projection images having higher quality than that of the related-art projector.

The projector 1004 in the third embodiment has a structure similar to that of the projector 1000 in the first embodiment except for the point that the polarization plates further have the supporting layers. Thus, the projector 1004 can offer advantages associated therewith and included in the advantages provided by the projector 1000 in the first embodiment.

The invention is not limited to the embodiments described and depicted herein, and it is thus intended that various modifications and changes may be made without departing from the scope and spirit of the invention. For example, the following changes may be made.

(1) According to the embodiments, the liquid crystal panel side light-transmissive substrates and the opposite side light-transmissive substrates are made of the same material. However, the invention is no limited to this, and the liquid crystal panel side light-transmissive substrates and the opposite side light-transmissive substrates may also be made of different materials. In this case, it is preferable that the axis direction in which the linear expansion coefficient of the liquid crystal panel side light-transmissive substrates becomes the maximum substantially agrees with the axis direction in which the linear expansion coefficient of the opposite side light-transmissive substrates becomes the maximum when the linear expansion coefficient of the liquid crystal panel side light-transmissive substrates is different from that of the opposite side light-transmissive substrates in the in-plane direction. In this structure, heat deformation of the polarization plates (incident side polarization plates or the exit side polarization plates) can be prevented.

(2) According to the embodiments, the liquid crystal panel side light-transmissive substrates and the opposite side light-transmissive substrates are disposed such that the optical axes of the respective light-transmissive substrates substantially parallel with the polarization axis of the polarization layer of the polarization plate (incident side polarization plate or exit side polarization plate). However, the invention is not limited to this, and the liquid crystal panel side light-transmissive substrates and the opposite side light-transmissive substrates may also be disposed such that the optical axes of the respective light-transmissive substrates substantially perpendicular to the polarization axis of the polarization layer of the polarization plate (incident side polarization plate or exit side polarization plate).

(3) According to the embodiments, the thickness of the liquid crystal panel side light-transmissive substrate is smaller than that of the opposite side light-transmissive substrate for all the light-transmissive substrates affixed to both surfaces of the three incident side polarization plates and the three exit side polarization plates. However, the invention is not limited to this, and such a projector is also included within the scope of the invention which has the liquid crystal panel side light-transmissive substrate thinner than the opposite side light-transmissive substrate for the light transmissive substrates affixed to both surfaces of only one of the three incident side polarization plates and one of the three exit side polarization plates, for example.

(4) According to the second embodiment, all of the opposite side light-transmissive substrates affixed to the three incident side polarization plates are bonded to the converging lenses, and all of the opposite side light-transmissive substrates affixed to the three exit side polarization plates are bonded to the light incident end surfaces of the cross dichroic prism. However, the invention is not limited to this, and such a projector in which only one of the opposite side light-transmissive substrates affixed to the three incident side polarization plates is bonded to the converging lens, and such a projector in which only one of the opposite side light-transmissive substrates affixed to the three exit side polarization plates is bonded to the light incident end surface of the cross dichroic prism are also included within the scope of the invention.

(5) According to the embodiments, the liquid crystal panel side light-transmissive substrates and the opposite side light-transmissive substrates are made of sapphire. However, the invention is not limited to this, and these light-transmissive substrates may also be made of crystal, quartz, heat-resisting glass (hard glass), crystallized glass, white plate glass, cubic system sintered body, or other materials.

(6) According to the embodiments, the reflector is constituted by the ellipsoidal reflector. However, the invention is not limited to this, and a parabolic reflector may also be preferably used.

(7) According to the embodiments, the sub mirror is used as the reflection unit for the arc tube. However, the invention is not limited to this, and a reflection film may also be preferably used as the reflection unit. Also, while the projector including the sub mirror as the reflection unit for the arc tube has been discussed in the embodiments, the invention may also be applied to a projector not including the sub mirror.

(8) According to the embodiments, the lens integrator system constituted by the lens array is used as a light equalizing system. However, the invention is not limited to this, and a rod integrator system having a rod member may also be preferably employed.

(9) While the projector including three liquid crystal panels has been discussed in the embodiments, the invention is also applicable to a projector including one, two, four, or more liquid crystal panels.

(10) The invention is also applicable to both a front projection type projector which projects projection images from the image viewing side, and a rear projection type projector which projects projection images from the side opposite to the image viewing side.

The entire disclosure of Japanese Patent Application No. 2007-320475, filed Dec. 12, 2007 is expressly incorporated by reference herein.

What is claimed is:

1. A projector comprising:
a lighting device which emits illumination light;
a liquid crystal panel which modulates the illumination light emitted from the lighting device according to image information;
a projection system which projects light modulated by the liquid crystal panel;
a polarization plate which is disposed at least either on the light incident side or the light exit side of the liquid crystal panel and has at least a polarization layer;
a liquid crystal panel side light-transmissive substrate affixed to the liquid crystal panel side surface of the polarization plate and made of inorganic material; and
an opposite side light-transmissive substrate affixed to the surface of the polarization plate on the side opposite to the liquid crystal panel side surface of the polarization plate,
the thickness of the liquid crystal panel side light-transmissive substrate is smaller than the thickness of the opposite side light-transmissive substrate.

2. The projector according to claim 1,
the liquid crystal panel side light-transmissive substrate and the opposite side light-transmissive substrate being made of the same material.

3. The projector according to claim 2,
the liquid crystal panel side light-transmissive substrate and the opposite side light-transmissive substrate being both made of sapphire or crystal.

4. The projector according to claim 3,
the light-transmissive substrates made of sapphire or crystal being disposed with respect to the polarization plate such that the optical axes of the light-transmissive substrates made of sapphire or crystal extend substantially parallel or substantially perpendicular to the polarization axis of the polarization layer.

5. The projector according to claim 1:
the liquid crystal panel side light-transmissive substrates and the opposite side light-transmissive substrates having different linear expansion coefficients according to the inplane directions; and
the axis direction in which the linear expansion coefficient of the liquid crystal panel side light-transmissive substrate becomes the largest substantially coincides with the axis direction in which the linear expansion coefficient of the opposite side light-transmissive substrate becomes the largest.

6. The projector according to claim 1, further comprising:
a converging lens disposed on the light incident side of the liquid crystal panel,
the polarization plate being disposed on the light incident side of the liquid crystal panel, and
the opposite side light-transmissive substrate affixed to the polarization plate being affixed to the light exit surface of the converging lens.

7. The projector according to claim 1, further comprising:
a color separation and light guide system which separates the illumination light emitted from the lighting device into a plurality of color lights and guides the separated lights to an illuminated area;
a plurality of liquid crystal panels each of which modulates the corresponding color light of the plural lights separated by the color separation and light guide system according to image information; and
a cross dichroic prism which has a plurality of light incident end surfaces into which the color lights modulated by the plural liquid crystal panels enter and a light exit end surface through which the combined color light emit,
the polarization plate is disposed on the light exit side of at least one of the plural liquid crystal panels, and
the opposite side light-transmissive substrate affixed to the polarization plate is bonded to the light incident end surface of the cross dichroic prism.

* * * * *